United States Patent [19]
Kraft et al.

[11] 3,851,949
[45] Dec. 3, 1974

[54] MICROSCOPE HAVING A PHOTOMETER

[75] Inventors: Winfried Kraft, Werdorf; Heiko Wasmund, Asslar; Karl-Heinz Haas, Wetzler, all of Germany

[73] Assignee: Ernst Leitz GmbH, Wetzlar, Germany

[22] Filed: Jan. 8, 1973

[21] Appl. No.: 321,949

Related U.S. Application Data
[63] Continuation of Ser. No. 153,691, June 16, 1971.

[30] Foreign Application Priority Data
June 18, 1970  Germany............................ 2029850
Apr. 10, 1971  Germany............................ 2117535

[52] U.S. Cl........................ 350/18, 350/17, 350/19, 350/33, 350/34, 356/219
[51] Int. Cl.............................................. G02b 21/18
[58] Field of Search............................... 350/17–19, 350/33, 34; 356/219

[56]  References Cited
UNITED STATES PATENTS
| | | | |
|---|---|---|---|
| 2,910,913 | 11/1959 | Michel | 350/19 |
| 3,106,129 | 10/1963 | Frenk et al. | 350/19 X |
| 3,405,989 | 10/1968 | Mentink | 350/19 X |
| 3,421,806 | 1/1969 | Weber | 350/19 |
| 3,458,244 | 7/1969 | Klein | 350/43 |
| 3,551,019 | 12/1970 | Michel | 350/19 X |
| 3,565,534 | 2/1971 | Chaban | 350/33 X |
| 3,652,163 | 3/1972 | Borkowski et al. | 350/14 X |
| 3,664,751 | 5/1972 | Haas | 350/17 X |

FOREIGN PATENTS OR APPLICATIONS
1,164,241   9/1969   Great Britain ........................ 350/38

*Primary Examiner*—David H. Rubin
*Attorney, Agent, or Firm*—Krafft & Wells

[57]  ABSTRACT

In microscopes having a photometer device disposed at or in an intermediate tube, wherein the tube is provided on one of its ends, or in the proximity thereof, at the underside with a coupling device for attachment to the stand and, on the opposite side, with a coupling device for the attachment of an ocular, the improvement comprising inserting the photometer, via a beam splitter, a tripple mirror connected thereafter, as well as an ocular, into the light flux of the intermediate tube. Other improvements disclosed are optical means provided in or at the intermediate tube or photometer, for introducing a beam path imaging measuring values and/or characteristic data and, an adjustable intensity regulator for the optical means.

9 Claims, 5 Drawing Figures

WINFRIED KRAFT
HEIKO WASMUND
KARL HEINZ HAAS
INVENTORS

BY Krafft + Wells

MICROSCOPE HAVING A PHOTOMETER

This is a continuation of Application Ser. No. 153,691, filed June 16, 1971.

CROSS REFERENCE TO RELATED APPLICATIONS

Applicants incorporate by reference the disclosure of copending application Ser. No. 633,525 filed in Apr. 25, 1967, (now abandoned) and assigned to the assignee of the present invention. Applicants claim priority under 35 U.S.C. 119 for Applications Ser. Nos. P20 29 850.4-51 and P21 17 535.9 filed June 18, 1970 and April 10, 1971, respectively, in the Patent Office of the Federal Republic of Germany the certified priority documents of which are enclosed in parent application Ser. No. 153,691, filed June 16, 1971, now abandoned.

BACKGROUND OF THE INVENTION

The field of the invention is optics, systems and elements having a compound lens system.

A microscope having an interchangeable intermediate tube is known, such as disclosed in copending application Ser. No. 633,525. This interchangeable tube is adapted to contain supplementary mechanisms, such as a phase-contrast unit, an automatic illumination measuring device, or a microphotographic apparatus. The housing of the intermediate tube accommodating these elements is provided, on one end of its underside, or in the vicinity thereof, with a coupling device, and the opposed end of its underside exhibits a support assembly. This intermediate tube is provided for attachment to microscopes, the stand of which exhibits a planar shoulder at the top.

A microscope photometer has been disclosed in U.S. Pat. No. 3,421,806 of Klaus Weber, which issued Jan. 14, 1969, wherein the observation of the object takes place through a variable restricted aperture and the detail to be measured, is effected via a separately disposed viewing telescope.

For this purpose, the microscopic image of the specimen must first be scanned in the normal ocular for significant points to be examined. Then, the object detail to be measured is placed approximately in the center of the viewing area to be monitored. Only at this point is it possible to switch over to the photometer section proper and in the eyepiece of the photometer section only a small central portion of the image field can be recognized. With the aid of a separate viewing telescope associated with the photometer section, the detail of the object to be examined can now be adjusted with respect to the measuring slit. Thus, the observer must look, during the operation of this microscope photometer and during the adjusting of the measuring slit with respect to the object detail, alternately into the normal eyepiece and additionally into a separate viewing telescope. However, this is not convenient, especially when living objects are to be observed, which can alter their relative position on the object slide and thus necessitate an additional adjustment of the setting of the device.

During the photometric measuring procedure by means of this device, the observer encounters a cutoff period, during which time he can read out the measuring value thus determined from an indicator arranged separately from the photometer and can then note down this indication by hand. It would be desirable for the observer to be able to read out the measuring value during the cutoff period without having to change his observation position.

SUMMARY OF THE INVENTION

Having in mind the limitations of the prior art, it is an object of the present invention to provide an apparatus making it possible to conduct the adjustment of the point of the specimen to be examined on the measuring slit directly by observing the microscopic image in the ocular.

It is another object of this invention to produce a photometer of the above-described type wherein the observer can perceive the photometric measuring data and/or characteristic values directly in the same viewing area, together with the microscopic image.

These objects are attained in accordance with the present invention, by providing a photometer, the beam path of which can be inserted, via a beam splitter, a triple reflector disposed thereafter, as well as an ocular, into the beam path of the intermediate tube. This is accomplished by installing the photometer at least in part in the intermediate tube; by providing a folding mirror controlled by a solenoid for switching over from the observation beam path to the measuring beam path and by, furthermore, arranging in the intermediate tube a stop for blocking light which can be inserted in the beam path on the ocular side. In other embodiments optical means are provided in or at the intermediate tube or photometer for introducing a beam path reproducing measuring values and/or characteristic data, wherein these optical means comprise a folding mirror which can be placed in the beam path of the intermediate tube. This mirror can also be fashioned as a partially transparent mirror, or a fixedly mounted partially transparent mirror, or an image conductor. Finally, an intensity control is provided for the automatic adaptation of the digit indicator intensity to the object intensity.

The special advantage of the photometer of the present invention is that the observer need employ only one eyepiece in order to be able to detect all significant details of the measuring device, the measuring object, and simultaneously the measuring result.

BRIEF DESCRIPTION OF THE DRAWINGS

Embodiments of the photometer of the present invention are illustrated in the drawings and are described below.

DESCRIPTION OF THE PREFERRED EMBODIMENTS

Figure 1:
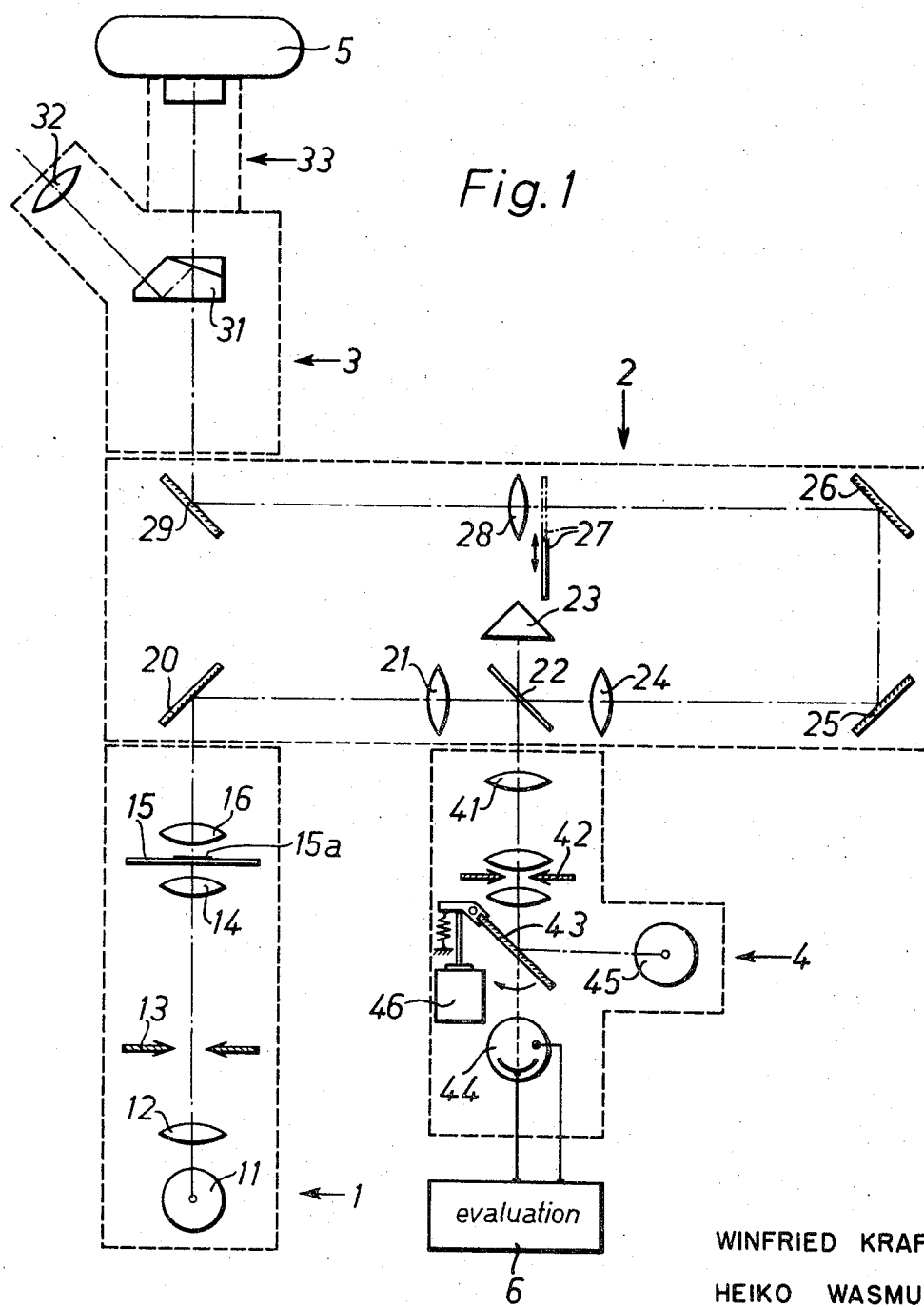
FIG. 1 is a schematic showing of the light beam path of the microscope according to the invention, equipped with the connected assembly of intermediate tube-photometer.

In FIG. 1, the subassembly 1 comprises the illuminator, the stage and the objectives. Subassembly 2 is the intermediate tube. Subassembly 3 comprises the ocular tube of the microscope with the binocular and subassembly 4 is the photometer. Subassembly 5 is a camera and subassembly 6 is a device for the electronic evaluation of the measuring values.

The light from lamp 11 illuminates, via a field lens 12, a radiant field stop 13, as well as a condenser 14, the object 15a disposed on a slide 15. This object 15a is reproduced by an objective 16, via a mirror 20, into an intermediate image plane of the ocular 21 and from there onto a beam splitter 22. This beam splitter branches off a part of the light into the subassembly 4. The light passing through the beam splitter produces an image of the object in the intermediate image plane of the ocular 24. The imaging beam path is guided, via deflecting mirrors 25, 26, an intermediate optic 28, as well as a further deflecting mirror 29, into the subassembly 3. The imaging beam path is split up in subassembly 3 into two components by means of a prism 31, one of which components is conducted to the ocular 32, and the other of which is guided to camera 5.

The imaging of measuring slit 42, provided in the subassembly 4, is effected by illuminating this slit by a light source 45 via the folding reflector 43. The beam of light rays leaving the slit is reproduced, via a lens 41, as well as through the beam splitter 22, on the triple reflector 23 and reflected by the latter. The reflected light is introduced, by the splitter 22, into the light beam path of the intermediate tube and thus passes to the ocular 32.

As can be seen, the folding mirror 43 is connected to a solenoid system 46, which system, after connection to a current source, controls the folding motion of the mirror in such a manner that the latter opens up the optical path to the photomultiplier 44.

A light stop 27 is provided in the intermediate tube and this light stop is inserted in the beam path of the intermediate tube when the optical path to the photomultiplier 44 has been opened up by the folding mirror. Thus, light is prevented from passing, during the photometric measurement, via the ocular 32 to the photomultiplier, thus falsifying the measuring value. The light stop can be controlled together with the folding mirror either manually or with a solenoid. The evaluation of the measuring values delivered by the photomultiplier is effected in subassembly 6 which comprises an analog-to-digital converter.

Figure 2:
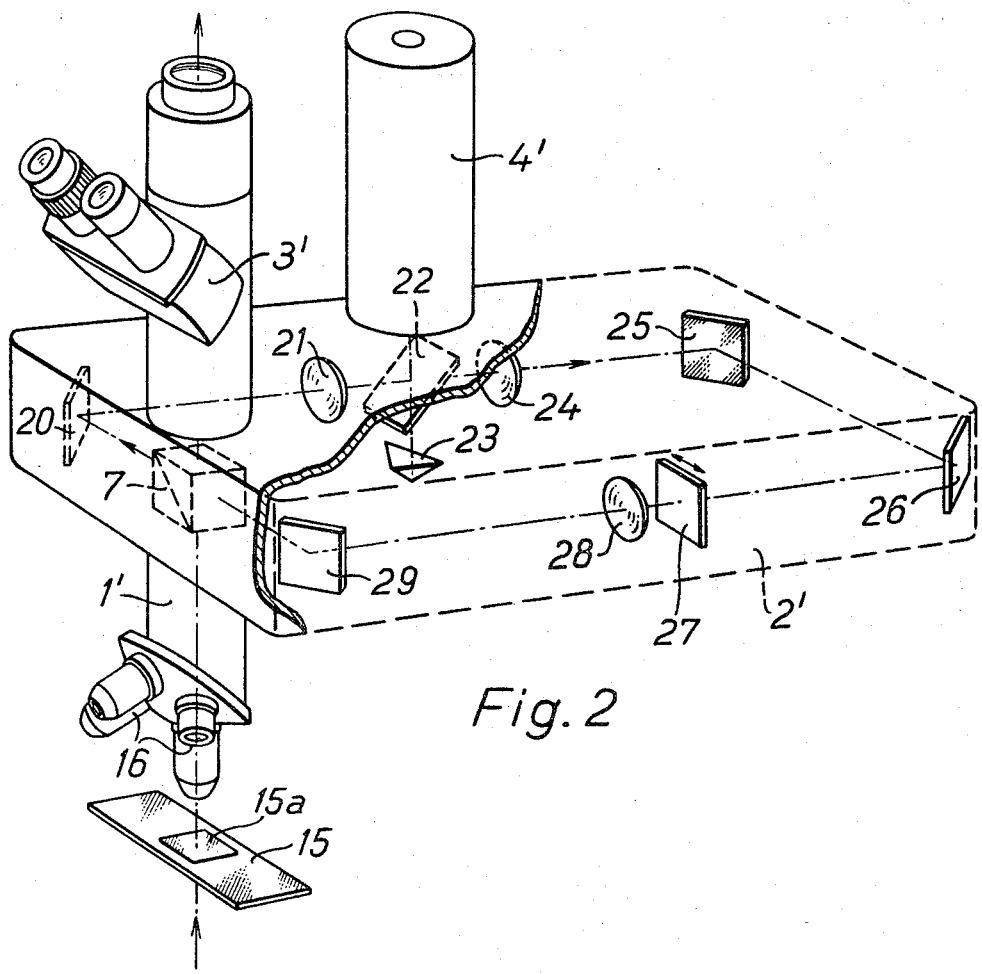
FIG. 2 is a perspective view of the most essential components schematically shown in FIG. 1.

It can be seen from FIG. 2 that components 7 and 20 through 29 are accommodated in a flat housing 2' as the intermediate tube connecting the ocular tube 3' and the objective section 1'.

Figure 3:
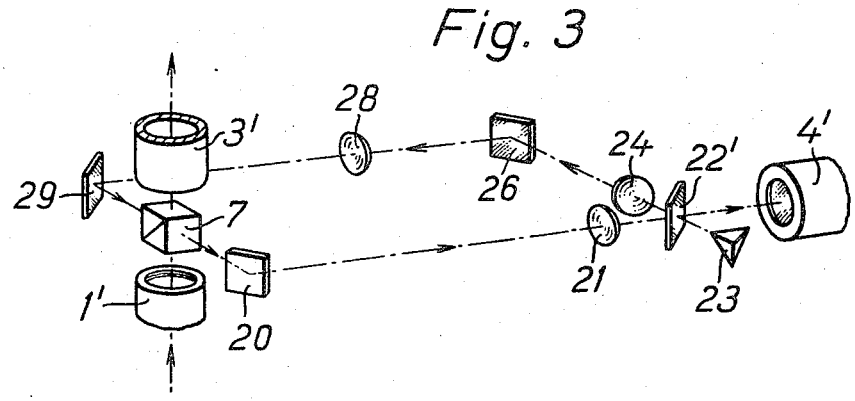
FIG. 3 is a perspective view of an embodiment modified with respect to FIG. 1.

FIG. 3 shows a further possibility for optionally connecting the photometer assembly 4 provided in the housing 4' to the intermediate tube. As is illustrated therein, the surface mirror 25 of FIGS. 1 and 2 is replaced by a splitter plate 22', and the housing 4' of subassembly 4 is disposed in an extension of the impinging rays. The triple reflector 23 is arranged in the extension of the emanating light beam path.

Figure 4:
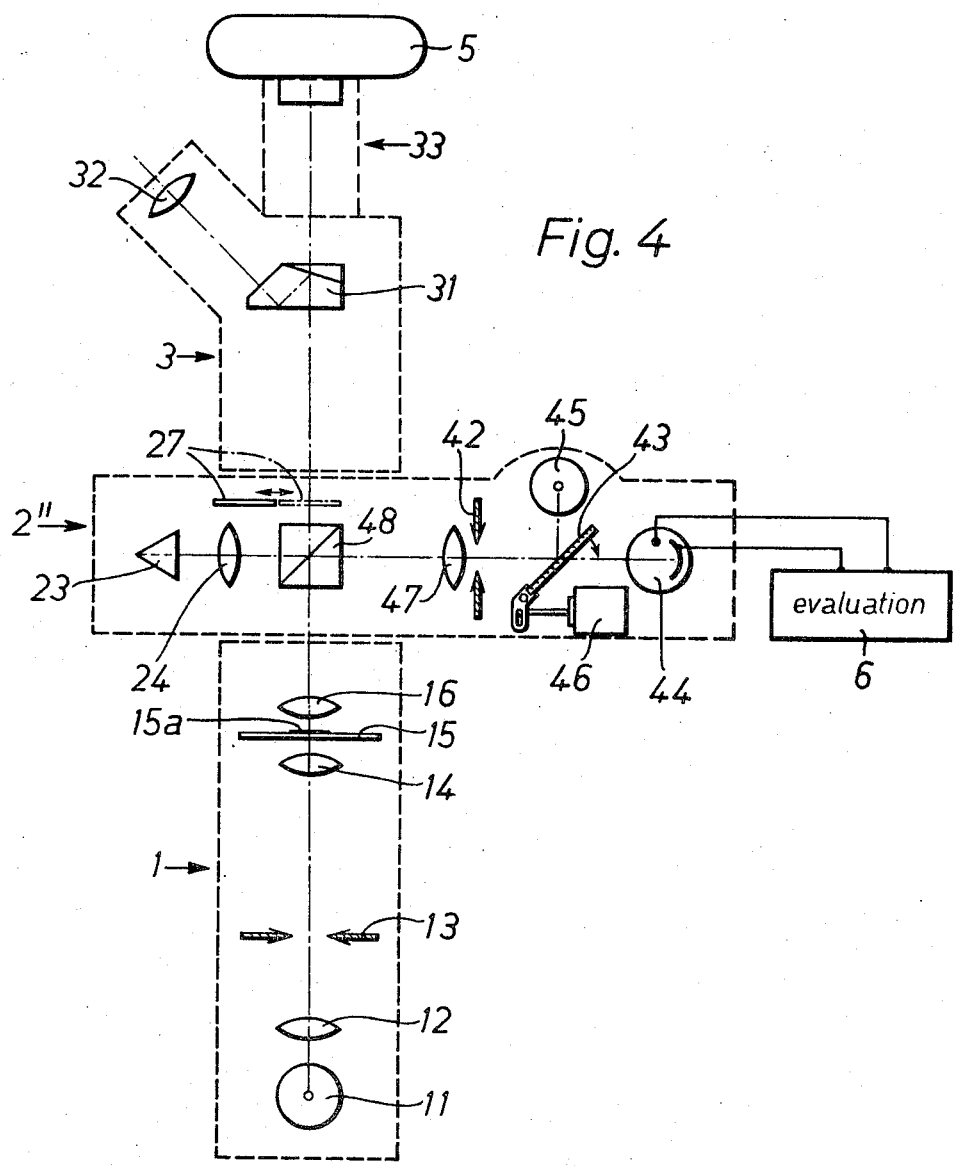
FIG. 4 shows another embodiment of the present invention with the photometer disposed within the intermediate tube.

FIG. 4 shows an embodiment wherein the photometer 4 is installed within the intermediate tube 2''. In this embodiment, a splitter cube 48 is connected after the subassembly 1 of FIG. 1. This splitter cube transmits the components of the reproducing beam passing through to the subassembly 3 and simultaneously connects the optical path of the photometer 4 to that of the microscope.

Figure 5:
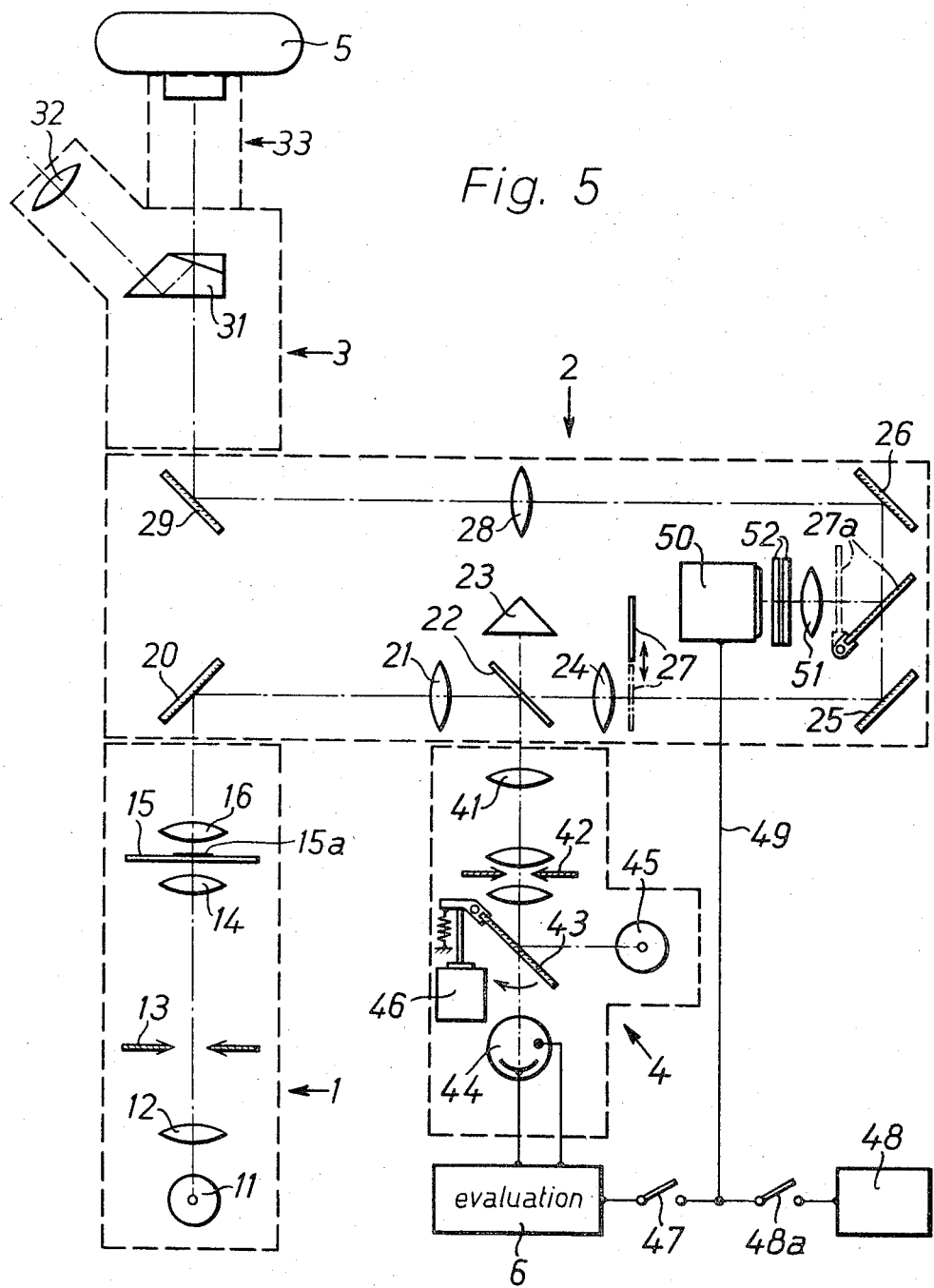
FIG. 5 illustrates the embodiment of FIG. 1 with an additional device for the introduction of measuring values.

FIG. 5, finally, shows an embodiment according to FIG. 1 with additional apparatus for the introduction of measuring and/or characteristic data into the intermediate tube.

During the photometric measuring procedure, the folding mirror 43 is not in the illustrated operating position, so that the measuring beam emanating from the object 15a can impinge on the photomultiplier 44.

The output signals of the photomultiplier are fed to an evaluation device 6 comprising an analog-to-digital converter, the output signals of which control, via a switch 47, as well as a line 49, an illuminated-digit indicating device 50.

The measuring value indicated accordingly is introduced, via an optic 51 and a folding mirror 27a, into the light flux of the intermediate tube 2 and thus into subassembly 3. In order to adapt the intensity of the digital indication to the intensity of the object, a polarizing filter system 52 can be disposed behind the indicator 50, which system effects the brightness adaptation by being controlled either manually or automatically.

The folding mirror 27a blocks, in the operative position, simultaneously the interfering light impinging from the ocular side and accordingly prevents a flasification of the photometric measuring result.

In addition to the introduction of the determined measuring values into the intermediate tube, it is also possible to introduce, by means of an input device 48, via a switch 48a and the line 49, any desired characteristic values — for example serial registration numbers, object-marking numbers, etc. — in a synchronous or successive manner.

The two switches 47 and 48a can be coupled with each other so that, when one switch is closed, the other is automatically opened.

The folding mirror 27a can also be fashioned as a partially transmissive reflector. Thereby, the observation beam path extending from subassembly 1 via the intermediate tube 2 to the subassembly 3 is not interrupted by the partially transmissive mirror which is in the operative position. Rather, in synchronism with the observation of the microscopic object, it is possible, for example, to introduce the above-mentioned characteristic data into the intermediate tube. Since, in case the folding mirror 27a is designed as a partially transmissive reflector, the interfering light impinging on the ocular side cannot be blocked by the mirror during the photometric measuring process, an additional blocking slide 27 is provided between the beam splitter 22 and the folding mirror 27a. For special purposes of application, the mirror 27a can be fixedly mounted in the illustrated position. It is also possible to provide an image conductor for the introduction of measuring and/or characteristic values.

We claim:
1. A microscope apparatus without an additional, separately disposed viewing telescope comprising:
   a. first optical means defining a main optical path for microscopic examination of an object positioned on a stage, said first optical means comprising in a first subassembly an illuminator with a field lens and a radiant field stop, a condenser, and an objective positioned in a first housing; in a second subassembly, mirrors, optical lenses, and a movable light blocking stop, defining a folded portion of the main optical path and positioned in a laterally extending intermediate tube coupled to said first housing;

b. second optical means for dividing said main optical path into an observation path and a measurement path, one of which is angularly displaced from said main path, said second optical means comprising a beam splitter and a triple mirror positioned in said intermediate tube;

c. third optical means defining a restrictive aperture the area of which may be varied, said third optical means comprising a measuring slit, said aperture being located in said measurement path between a folding mirror and a lens, said beam splitting means causing an image of said aperture to be formed in said observation path;

d. fourth optical means for ocular observation comprising an ocular positioned in an ocular tube coupled to said intermediate tube for simultaneously observing the images of said object and of said aperture, said image of said aperture positioned to indicate that portion of said object from which the illumination will be measured;

e. fifth optical means for illuminating said aperture to permit observation thereof, said optical means comprising a light source and said folding mirror;

f. sixth optical means positioned in said measurement path to photometrically receive and measure the intensity of light from said main optical path after passage of said light through said lens and said measuring slit and impingement on a photomultiplier; and g. said triple mirror positioned in said measurement path and located after said beam splitter in said intermediate tube for reflecting the image of said aperture into said observation path.

2. The microscope apparatus of claim 1, wherein said third, fifth and sixth optical means (c), (e) and (f) are positioned in a photometer housing attached to said intermediate tube.

3. The microscope apparatus of claim 1, wherein said third, fifth and six optical means (c), (e) and (f) are positioned within said intermediate tube.

4. The microscope apparatus of claim 1, wherein said folding mirror is retractably positioned in said measurement path by a solenoid.

5. The microscope apparatus of claim 1, wherein said movable light blocking stop is retractably positioned in said main optical path between said means for dividing and said ocular.

6. The microscope apparatus of claim 1, wherein means are provided for optically introducing measuring values or characteristic data into said main optical path.

7. The microscope apparatus of claim 6, wherein said means for introducing comprises a second folding mirror located in said intermediate tube.

8. The microscope apparatus of claim 6, wherein said means for introducing comprises a fixedly mounted partially transparent mirror.

9. The microscope apparatus of claim 6, wherein said means for introducing comprises an adjustable intensity regulator.

* * * * *